Patented Apr. 27, 1926.

1,582,126

UNITED STATES PATENT OFFICE.

HUGH S. COOPER AND LE RUE P. BENSING, OF CLEVELAND, OHIO, ASSIGNORS TO KEMET LABORATORIES COMPANY, INC., OF CLEVELAND, OHIO, A CORPORATION OF NEW YORK.

PRODUCTION OF ZIRCONIUM OXIDE.

No Drawing.   Application filed March 1, 1920.   Serial No. 362,179.

To all whom it may concern:

Be it known that we, HUGH S. COOPER and LE RUE P. BENSING, citizens of the United States, residing at Cleveland, in the county of Cuyahoga and State of Ohio, have invented certain new and useful Improvements in the Production of Zirconium Oxide, of which the following is a specification.

This invention is a process whereby substantially pure zirconium oxide, of excellent color and well-adapted for use as an opacifier and for numerous other purposes in the arts, may be prepared from crude ores of zirconium, such for example as zircon, baddeleyite and other ferruginous raw materials. According to our process the zirconium content of such ore is first transformed into anhydrous zirconium chlorid of high purity, and this anhydrous salt is thereafter converted into the substantially iron-free oxide.

For the preparation of the anhydrous chlorid in a form sufficiently free from iron to serve the purposes of this invention, the following methods have been found satisfactory:

(1) The crude zirconium ore is mixed with carbon and reduced in the electric furnace to carbid, carbonitrid, or a mixture of these compounds, this operation being carried out in accordance with any of the known methods. The reduced product, which usually contains considerable proportions of iron, titanium and silicon, is then crushed, and heated in an atmosphere containing chlorin. For the best results the temperature during the chlorination should be maintained within limits of 450—650° C. Within this temperature range, we have found that the highly volatile chlorids of titanium and silicon are practically eliminated during the early stages of the chlorination, while the contamination of the product by iron, which is very pronounced above the temperature range mentioned, is so far avoided that the anhydrous chlorid is directly available for transformation into commercially pure zirconium oxide. For example, by chlorinating zirconium carbide containing the equivalent of about 2% of ferric oxide, we have been able to prepare a chloride which, by hydrolysis and ignition as described below, yielded an oxide containing only 0.36% ferric oxide.

The principal reaction which takes place during chlorination may be expressed as follows:

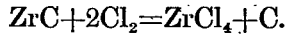
$$ZrC + 2Cl_2 = ZrCl_4 + C.$$

As this reaction proceeds the carbon is progressively set free in graphitic form and substantially retains the original shape of the mass. This fact renders it practicable to carry out the chlorination in an electric furnace of the resistance type in which the charge serves as the resistance element, a continuous flow of chlorin being maintained until substantially all of the zirconium has been distilled off and collected in the form of anhydrous chlorid. For instance the carbid or carbo-nitrid may be placed in a vertical tube of fused silica fitted with top and bottom electrodes and connected with a condenser, the charge being brought to the specified temperature by direct passage of the current therethrough, and the chlorin being continuously passed through the charge, preferably in an upward direction. Our invention is not limited, however, to this particular manner of chlorinating the material, since the operation may be carried out in any suitable type of furnace, composed for example of silica, graphite or carbon, and heated either electrically or otherwise to the proper reacting temperature.

(2) In treating a raw material containing a relatively high proportion of iron, we prefer to eliminate a portion at least of the iron by a suitable treatment preliminary to the chlorinating operation. The resulting partially purified product may then be reduced to carbid or carbo-nitrid and chlorinated in any of the ways described above; or alternatively, it may be mixed with carbon and its zirconium content converted directly into anhydrous chlorid in the manner described below.

For example, we may treat the crude Brazilian ore known as baddeleyite, which may vary in composition as follows:

| | | |
|---|---|---|
| $ZrO_2$ | 55.84 | 73.84 |
| $Fe_2O_3$ | 0.96 | 7.25 |
| $TiO_2$ | 2.68 | 5.12 |
| $SiO_2$ | 1.00 | 18.00 |
| $Al_2O_3$ | 1.50 | 6.58 |

Any metallic iron derived from crushers or otherwise may first be removed by magnetic or gravity separation. The ore is then ground, preferably to about 100 mesh, and is thereafter thoroughly mixed and ground with common salt. Proportions of salt varying from an equal proportion by weight to the ore, to double this proportion, may be employed. The mixture is then heated to about 800° C., and this temperature is maintained for some hours, or until the mass assumes a semi-plastic consistence. After cooling the charge is broken up, heated with water, permitted to settle, washed repeatedly by decantation, and finally filtered, washed and dried. In this way a substantial proportion of the iron, which may amount to 75% of the total iron content, may be eliminated in the form of soluble salts, without material loss of zirconium.

The partially purified and dried ore is then mixed with upward of 10% by weight of powdered carbon, about 25% being preferred for an ore of the particular composition mentioned above. The mixture is then heated in a chlorin-containing atmosphere to a temperature which preferably lies between 900° and 1200° C., the optimum operating temperature being in the neighborhood of 1100° C. The chlorin-containing atmosphere may consist of either dry or moist chlorin, or of a mixture of chlorin with gaseous hydrochloric acid, the passage of the gas being continued until the zirconium content of the ore has been substantially transformed into the anhydrous chlorid, which, if the preliminary treatment has been properly conducted, will be sufficiently free from iron for the purposes of this invention. This chlorination treatment may be carried out in a variety of ways, among which the following may be mentioned:

(*a*) The mixture is charged into a tube furnace composed of fused silicia, graphite or carbon, and externally heated to the specified temperature in any suitable manner, as for example by electricity or gas-flame.

(*b*) The mixture containing an excess of carbon is pressed into briquettes, which are directly heated to the desired temperature by the passage of the electric current, the charge serving as the resistor.

(*c*) The mixture of finely powdered ore and carbon is further mixed with coarse carbon in order to increase its porosity, and is then charged into a crucible or other type of furnace and subjected to chlorination at the proper temperature.

By operating in accordance with any of these arrangements the zirconium content of the ore is transformed almost completely into the anhydrous chlorid, and in the case of the carbid or carbo-nitrid when the operation is carried out within the temperature limits specified above, or in the case of the zirconium ore-carbon mixture when the preliminary purification has been adequately performed, this anhydrous chlorid may be collected in sufficiently iron-free state to permit its direct transformation into a white oxide available without further purification for commercial purposes.

The anhydrous chlorid, however prepared, is now transformed into the oxide. For this purpose the following methods have proven satisfactory.

The anhydrous chlorid is dissolved in cold distilled water until a solution having a gravity of about 1.30 is obtained. This solution, which should be slightly acid, is heated to the boiling point, filtered, and precipitated with sodium thiosulfate. For the best results this precipitation should be carried out under carefully controlled conditions as follows: A concentrated solution of sodium thiosulfate is added to the hot solution as long as precipitation continues and the mixture boiled for some time. After the precipitation is complete, the mixture is allowed to settle, and the supernatant liquid decanted. The precipitate is washed very thoroughly with hot water, filtered, dried and ignited or calcined to a white oxide of circonium.

As an alternative method for converting the anhydrous chlorid prepared by any of the methods above described into a very pure white oxide, the following process may be employed:

The anhydrous zirconium chlorid is exposed for several hours to moist atmosphere, which results in the elimination of a part of the chlorin in the form of gaseous hydrochloric acid, the reaction probably involving a direct hydrolysis of the chlorid which may perhaps be expressed as follows:

$$2ZrCl_4 + 2H_2O = 2ZrOCl_2 + 4HCl.$$

The resulting oxychlorid which may vary in color from pure white to light yellow, is gently warmed for several hours at a temperature not exceeding 75° C. The product of this treatment has lost most of its moisture and some additional chlorin, and has become highly basic. The temperature is then raised to about 150° C. and the heating continued until the product is practically insoluble in water.

This product should contain traces only of chlorin, and is treated with boiling water and filtered to recover the pure oxide. The filtrate contains traces only of zirconium which of course may be recovered if desired.

The processes as described above yield, as stated, an extremely pure zirconium oxide which, if the operations have been properly performed, should contain upward of 99% of $ZrO_2$. Representative analyses of such products are as follows:

|  | I | II |
|---|---|---|
| Zirconium oxide | 99.45 | 99.44 |
| Ferric oxide | 0.16 | 0.36 |
| Titanium oxide | 0.18 | 0.12 |
| Silica | 0.06 | 0.18 |

Instead of proceeding as above, the anhydrous zirconium chlorid may be directly hydrolyzed by exposure to moisture in the form of steam at a suitable temperature, usually between 100°–200° C., temperatures between 150° C–200° C. being now regarded as preferable. The resulting product is substantially chlorin-free, but may contain some residual moisture or hydroxyl groups which may be eliminated by calcination at a higher temperature range.

Another method whereby the oxide may be prepared directly from the anhydrous chlorid without the intervention of moisture is as follows: the freshly prepared anhydrous chlorid is subjected to moderate heating in air, say from 75°–125° C., until a part of the chlorin has been expelled. The temperature is then gradually and progressively increased, with further expulsion of chlorin. As the chlorin is driven off, and the product becomes progressively more basic, its fusing point rises; and it is important that the temperature-increase should be so regulated that fusion does not occur. When the bulk of the chlorin has been driven off in this manner, and replaced by oxygen, the product may be subjected to full ignition, at 900°–1400° C., whereby it is wholly converted into the oxide.

The expression "zirconium-carbon composition" is used herein to include both zirconium carbid or carbo-nitrid or mixtures thereof on the one hand, and mixtures of zirconium ore and carbon on the other, either of which compositions may be chlorinated as described above for the preparation of the anhydrous chlorid sufficiently free from iron for the purposes of this invention. The expression "reduction compound containing zirconium" is used to include zirconium carbid, zirconium carbo-nitrid, or such mixtures thereof as may result from the electric furnace reduction of zirconium-bearing ores.

We claim:—

1. Process of preparing commercially pure zirconium oxide from impure zirconium-bearing materials, comprising chlorinating a reduction compound of zirconium at a temperature approximating 450–650° C., and converting the anhydrous zirconium chlorid thereby obtained into zirconium oxide.

2. In the process of preparing commercially pure zirconium oxide from impure zirconium-bearing materials, the steps of chlorinating a reduction compound of zirconium at a temperature approximating 450–650° C., and hydrolyzing the resulting anhydrous chlorid.

3. Process of preparing commercially pure zirconium oxide from impure zirconium-bearing materials, comprising chlorinating a reduction compound of zirconium at a temperature approximating 450–650° C., and hydrolyzing the resulting anhydrous chlorid by exposing the same to moisture and heating at progressively increasing temperatures to form zirconium oxide.

4. Process of preparing commercially pure zirconium oxide from ferruginous zirconium-bearing materials, comprising eliminating a portion of the iron, thereafter transforming the zirconium content of the purified residue into anhydrous chlorid, and converting the chlorid into oxide.

5. Process of preparing commercially pure zirconium oxide from ferruginous zirconium-bearing materials, comprising eliminating a portion of the iron by heating the material with salt to a semi-plastic state and removing the water-soluble components, thereafter transforming the zirconium content of the purified residue into anhydrous chlorid, and converting the chlorid into oxide.

6. In a process of preparing commercially pure zirconium oxide from impure zirconium-bearing materials, the step preliminary to the production of the oxide, which consists in chlorinating a ferruginous reduction compound of zirconium at a temperature approximating 450–650° C.

7. In a process of preparing commercially pure zirconium oxide from impure zirconium-bearing materials, obtaining from such materials anhydrous zirconium chlorid, substantially free from iron, and subjecting the chlorid to the hydrolyzing action of moisture, thereby producing zirconium oxide.

8. In a process of preparing commercially pure zirconium oxide from impure zirconium-bearing materials, obtaining from such materials anhydrous zirconium chlorid, substantially free from iron, and subjecting the chlorid to the hydrolyzing action of steam, thereby producing zirconium oxide.

9. In a process of preparing commercially pure zirconium oxide, the step which consists in subjecting anhydrous zirconium chlorid, substantially free from iron, to the hydrolyzing action of moisture and heating at progressively increasing temperatures, thereby producing zirconium oxide.

10. In a process of preparing zirconium oxide, the step which consists in subjecting anhydrous zirconium chlorid, in presence of oxygen, to progressively increasing temperatures below the fusing point, whereby the chlorin is progressively eliminated and zirconium oxide is formed.

In testimony whereof, we affix our signatures.

HUGH S. COOPER.
LE RUE P. BENSING.